US010169763B2

(12) United States Patent
B'Far et al.

(10) Patent No.: US 10,169,763 B2
(45) Date of Patent: Jan. 1, 2019

(54) TECHNIQUES FOR ANALYZING DATA FROM MULTIPLE SOURCES

(71) Applicant: Oracle International Corporation, Redwood Shores, CA (US)

(72) Inventors: Reza B'Far, Huntington Beach, CA (US); Siddharth Sinha, Palo Alto, CA (US); Ryan Golden, Austin, TX (US); Uppili Srinivasan, Irvine, CA (US); Alan Waxman, Morganville, NJ (US); Mike Adourian, Irvine, CA (US); Nigel Jacobs, Austin, TX (US)

(73) Assignee: Oracle International Corporation, Redwood Shores, CA (US)

(*) Notice: Subject to any disclaimer, the term of this patent is extended or adjusted under 35 U.S.C. 154(b) by 775 days.

(21) Appl. No.: 14/599,194

(22) Filed: Jan. 16, 2015

(65) Prior Publication Data
US 2015/0134551 A1     May 14, 2015

Related U.S. Application Data

(63) Continuation of application No. 12/846,684, filed on Jul. 29, 2010, now Pat. No. 8,949,236.

(51) Int. Cl.
*G06Q 30/00* (2012.01)
*G06F 17/30* (2006.01)
*G06Q 30/06* (2012.01)

(52) U.S. Cl.
CPC ..... *G06Q 30/018* (2013.01); *G06F 17/30292* (2013.01); *G06F 17/30507* (2013.01); *G06Q 30/06* (2013.01)

(58) Field of Classification Search
CPC .............. G06F 17/30292; G06F 17/30507
USPC ............................................ 707/737
See application file for complete search history.

(56) References Cited

U.S. PATENT DOCUMENTS

| 5,630,025 | A  | 5/1997  | Dolby et al.   |
|-----------|----|---------|----------------|
| 5,983,272 | A  | 11/1999 | Rosen et al.   |
| 6,029,144 | A  | 2/2000  | Barrett et al. |
| 6,076,083 | A  | 6/2000  | Baker          |
| 6,081,657 | A  | 6/2000  | Ott            |
| 6,381,564 | B1 | 4/2002  | Davis et al.   |
| 6,484,261 | B1 | 11/2002 | Wiegel         |
| 6,801,883 | B1 | 10/2004 | Hurlock        |
| 6,917,840 | B2 | 7/2005  | Lund           |
| 6,980,939 | B2 | 12/2005 | Dhir et al.    |
| 7,050,863 | B2 | 5/2006  | Mehta et al.   |

(Continued)

OTHER PUBLICATIONS

U.S. Appl. No. 12/714,206, Non-Final Office Action, dated Jun. 8, 2015, 13 pages.

(Continued)

*Primary Examiner* — Hosain T Alam
*Assistant Examiner* — Saba Ahmed
(74) *Attorney, Agent, or Firm* — Kilpatrick Townsend & Stockton LLP

(57) ABSTRACT

Techniques, including systems are methods, for analyzing data from multiple sources are disclosed and suggested herein. In an embodiment, information from one or more information sources is received. The received information is stored in one or more data stores that collectively implement one or more ontologies. One or more conditions are applied to the information in the one or more data stores to determine a conclusion.

20 Claims, 6 Drawing Sheets

(56) References Cited

U.S. PATENT DOCUMENTS

| | | |
|---|---|---|
| 7,092,845 B2 | 8/2006 | Keane et al. |
| 7,266,847 B2 | 9/2007 | Pauker et al. |
| 7,321,883 B1 | 1/2008 | Freedy et al. |
| 7,340,469 B1 | 3/2008 | Alghathbar et al. |
| 7,379,890 B2 | 5/2008 | Myr et al. |
| 7,467,333 B2 | 12/2008 | Keeton et al. |
| 7,493,630 B2 | 2/2009 | Hunt |
| 7,512,965 B1 | 3/2009 | Amdur et al. |
| 7,539,676 B2 | 5/2009 | Aravamudan |
| 7,630,877 B2 | 12/2009 | Brown et al. |
| 7,657,935 B2 | 2/2010 | Stolfo et al. |
| 7,734,564 B2 | 6/2010 | Kaseda et al. |
| 7,770,151 B2 | 8/2010 | Sanjar et al. |
| 7,836,427 B1 | 11/2010 | Li et al. |
| 8,024,682 B2 | 9/2011 | McConaghy et al. |
| 8,108,413 B2 | 1/2012 | Kar et al. |
| 8,131,677 B2 | 3/2012 | Hsu |
| 8,166,001 B1 | 4/2012 | Grieves et al. |
| 8,204,719 B2 | 6/2012 | Diao et al. |
| 8,307,343 B2 | 11/2012 | Chaudhuri et al. |
| 8,312,171 B2 | 11/2012 | B'Far et al. |
| 8,315,960 B2 | 11/2012 | Chen et al. |
| 8,438,378 B2 | 5/2013 | Lazar |
| 8,631,046 B2 | 1/2014 | B'Far et al. |
| 8,898,096 B2 | 11/2014 | Caves et al. |
| 8,949,236 B2 | 2/2015 | B'far et al. |
| 8,954,309 B2 | 2/2015 | B'far et al. |
| 9,400,958 B2 | 7/2016 | B'Far et al. |
| 9,686,332 B1* | 6/2017 | Binns .................. H04L 65/4084 |
| 2002/0169957 A1 | 11/2002 | Hale et al. |
| 2002/0191541 A1 | 12/2002 | Buchanan et al. |
| 2003/0028859 A1 | 2/2003 | Street et al. |
| 2003/0088449 A1 | 5/2003 | Menninger |
| 2003/0110192 A1 | 6/2003 | Valente et al. |
| 2003/0135354 A1 | 7/2003 | Gabele et al. |
| 2003/0229478 A1 | 12/2003 | Rappaport et al. |
| 2004/0006589 A1 | 1/2004 | Maconi et al. |
| 2004/0068712 A1 | 4/2004 | Heng et al. |
| 2004/0093344 A1 | 5/2004 | Berger et al. |
| 2004/0107124 A1 | 6/2004 | Sharpe et al. |
| 2004/0139095 A1 | 7/2004 | Trastour et al. |
| 2004/0162741 A1 | 8/2004 | Flaxer et al. |
| 2004/0167862 A1 | 8/2004 | Yabloko |
| 2004/0210654 A1 | 10/2004 | Hrastar |
| 2005/0007249 A1 | 1/2005 | Eryurek et al. |
| 2005/0038764 A1 | 2/2005 | Minsky et al. |
| 2005/0097449 A1 | 5/2005 | Lumera et al. |
| 2005/0116927 A1 | 6/2005 | Voelckers |
| 2005/0182657 A1 | 8/2005 | Abraham-Fuchs et al. |
| 2005/0209876 A1 | 9/2005 | Kennis et al. |
| 2005/0262230 A1 | 11/2005 | Liu et al. |
| 2006/0025985 A1 | 2/2006 | Vinberg et al. |
| 2006/0059117 A1 | 3/2006 | Tolson et al. |
| 2006/0195798 A1 | 8/2006 | Chan et al. |
| 2006/0212486 A1* | 9/2006 | Kennis .............. G06F 17/30569 |
| 2006/0242101 A1 | 10/2006 | Akkiraju et al. |
| 2006/0262740 A1 | 11/2006 | Schirmer et al. |
| 2006/0277170 A1 | 12/2006 | Watry et al. |
| 2006/0286514 A1 | 12/2006 | Gross |
| 2007/0005692 A1 | 1/2007 | Gist et al. |
| 2007/0033188 A1 | 2/2007 | Levy et al. |
| 2007/0033273 A1 | 2/2007 | White et al. |
| 2007/0143338 A1 | 7/2007 | Wang et al. |
| 2007/0174106 A1 | 7/2007 | Aniszczyk et al. |
| 2007/0192863 A1 | 8/2007 | Kapoor et al. |
| 2007/0239572 A1 | 10/2007 | Harris et al. |
| 2008/0010597 A1 | 1/2008 | Seemann et al. |
| 2008/0010609 A1 | 1/2008 | Curtis et al. |
| 2008/0021822 A1 | 1/2008 | Hinton et al. |
| 2008/0040245 A1 | 2/2008 | Wadawadigi et al. |
| 2008/0082374 A1 | 4/2008 | Kennis et al. |
| 2008/0082380 A1 | 4/2008 | Stephenson |
| 2008/0109475 A1 | 5/2008 | Burmester et al. |
| 2008/0147610 A1 | 6/2008 | Mohanty et al. |
| 2008/0209506 A1 | 8/2008 | Ghai et al. |
| 2008/0250390 A1 | 10/2008 | Feblowitz et al. |
| 2008/0256121 A1 | 10/2008 | Liu et al. |
| 2008/0270303 A1 | 10/2008 | Zhou et al. |
| 2008/0282321 A1 | 11/2008 | Hecht et al. |
| 2008/0306894 A1 | 12/2008 | Rajkumar et al. |
| 2008/0319937 A1 | 12/2008 | Stuhec et al. |
| 2009/0112780 A1 | 4/2009 | Chen et al. |
| 2009/0182856 A1 | 7/2009 | Gotta et al. |
| 2009/0183227 A1 | 7/2009 | Isaacs et al. |
| 2009/0198474 A1 | 8/2009 | Fritz et al. |
| 2009/0216731 A1 | 8/2009 | Markovic |
| 2009/0281996 A1 | 11/2009 | Liu et al. |
| 2009/0300002 A1 | 12/2009 | Thomas et al. |
| 2009/0307028 A1 | 12/2009 | Eldon et al. |
| 2009/0319092 A1 | 12/2009 | Piche |
| 2009/0328222 A1 | 12/2009 | Helman et al. |
| 2010/0031240 A1 | 2/2010 | Drumm et al. |
| 2010/0070422 A1 | 3/2010 | Kikuchi et al. |
| 2010/0174754 A1 | 7/2010 | B'Far et al. |
| 2010/0218134 A1 | 8/2010 | B'Far et al. |
| 2010/0250779 A1 | 9/2010 | B'Far et al. |
| 2011/0099638 A1 | 4/2011 | Jones et al. |
| 2011/0191271 A1 | 8/2011 | Baker et al. |
| 2011/0206198 A1* | 8/2011 | Freedman .............. G06Q 30/06 379/265.03 |
| 2012/0005631 A1 | 1/2012 | B'Far et al. |
| 2012/0030202 A1* | 2/2012 | B'Far ................ G06F 17/30507 707/737 |
| 2012/0310618 A1 | 12/2012 | B'Far et al. |
| 2012/0310870 A1 | 12/2012 | Caves et al. |
| 2014/0108461 A1 | 4/2014 | B'Far et al. |
| 2016/0328668 A1 | 11/2016 | B'Far et al. |

OTHER PUBLICATIONS

U.S. Appl. No. 12/714,206, Final Office Action dated Nov. 4, 2016, 13 pages.

U.S. Appl. No. 12/714,206; Notice of Allowance dated Jan. 20, 2017, 11 pages.

U.S. Appl. No. 12/827,068 Final Office Action dated Mar. 26, 2015, 17 Pages.

U.S. Appl. No. 15/217,818, "Non-Final Office Action", dated Sep. 11, 2018, 28 pages.

U.S. Appl. No. 12/684,065 , "Advisory Action", dated May 21, 2012, 3 pages.

U.S. Appl. No. 12/714,206 , "Non-Final Office Action", dated Jun. 17, 2016, 11 pages.

U.S. Appl. No. 12/827,068 , "Advisory Action", dated Oct. 2, 2013, 3 pages.

U.S. Appl. No. 12/827,068 , "Notice of Allowance", dated Mar. 28, 2016, 18 pages.

U.S. Appl. No. 14/107,991 , "Final Office Action", dated Jan. 21, 2015, 12 pages.

U.S. Appl. No. 14/107,991 , "Final Office Action", dated Feb. 4, 2016, 14 pages.

U.S. Appl. No. 14/107,991 , "Non-Final Office Action", dated Jun. 2, 2014, 12 pages.

U.S. Appl. No. 14/107,991 , "Notice of Allowance", dated May 20, 2016, 8 pages.

Bates et al., "Formulation of the Audze-Eglais Uniform Latin Hypercube Design of Experiments," *Advances in Engineering Software*, vol. 34, 2003, pp. 493-506.

Bates et al., "Formulation of the Optimal Latin Hypercube Design of Experiments Using a Permutation Genetic Algorithm," *Proceedings of the In 45th AIAA/ASME/ASCE/AHS/ASC Structures, Structural Dynamics and Materials Conference*, Apr. 2004.

Bishop *Pattern Recognition and Machine Learning*, Springer, New York, NY (2006).

Boning et al, "DOE/Opt: A System for Design of Experiments, Response Surface Modeling, and Optimization Using Process and Device Simulation", Texas Instruments Semiconductor Process and Design Center, Dec. 7, 1993.

Bruns et al., "A Simple and Expressive Semantic Framework for Policy Composition in Access Control," *ACM SIG on Security, Audit and Control*, 10pp (2007).

(56) References Cited

OTHER PUBLICATIONS

Chen et al, "Experience Transfer for the Configuration Tuning in Large-Scale Computing Systems", IEEE Transactions on Knowledge and Data Engineering, vol. 23, No. 3, Mar. 2011.
Cheng et al, "Latin Hypercube Sampling in Bayesian Networks", FLAIRS-00 Proceedings, 2000.
Chung et al. "A Case Study Using Automatic Performance Tuning for Large Scale Scientific Programs," *15th IEEE International Conference on High Performance Distributed Computing*, 2006, pp. 45-56.
Codd,"A Relational Model of Data for Large Shared Data Banks," *Communications of the ACM*, vol. 13, No. 6, pp. 377-387 (Jun. 1970).
Cook et al., "Predictive Design Space Exploration Using Genetically Programmed Response Surfaces," *Proceedings of the 45th ACM/IEEE Conference on Design Automation (DAC)*, Jun. 2008.
De Luca et al."Ontology-Based Semantic Online Classification of Documents: Supporting Users in Searching the Web," *Proc. of the European Symposium on Intelligent Technologies (EUNITE)*, 9pp., (2004).
Dean et al., "MapReduce: Simplified Data Processing on Large Clusters", Proceedings of the 6th Symposium on Operating Systems Design and Implementation (OSDI '04), 2004, pp. 137-149.
Duan et al, "Tuning Database Configuration Parameters with iTuned", VLDB, Aug. 24-28, 2009.
Fukunaga *Statistical Pattern Recognition*, Morgan Kaufmann, San Francisco, CA (1990).
Goldberg *Genetic Algorithms in Search Optimization and Machine Learning*, 1989, Table of Contents & pp. 41-45, Addison Wesley.
Gray "The Transaction Concept: Virtues and Limitations," *Proceedings of the 7th International Conference on Very Large Data Bases*, pp. 144-154, Tandem Computers: Cupertino, CA (Sep. 1983).
Hassoun *Fundamentals of Artificial Neural Networks*, 1995, MIT Press.
Huynh et al., "The Semantic User Interface Paradigm for Presenting Semi-structured Information," 2pp, MIT Artificial Intelligence Laboratory, Cambridge, MA (2002).
Ipek et al. "An Approach to Performance Prediction for Parallel Applications," *EURO-PAR* 2005, pp. 196-205.
Ipek et al. "Efficiently Exploring Architectural Design Spaces via Predictive Modeling," *ASPLOS*, 2006, pp. 195-206.
Kennedy et al. "Particle Swarm Optimization," *Proceedings of IEEE International Conference on Neural Networks*, vol. 4, 1995, pp. 1942-1948.
Koch et al, "Interdigitation for Effective Design Space Exploration Using iSIGHT", Struct. Multidisc. Optim. 23, pp. 111-126, 2002.
Li et al., "Accurate and Efficient Processor Performance Prediction via Regression Tree Based Modeling," Journal of Systems Architecture, vol. 55, 2009, pp. 457-467.
Nelder "A Simplex Method for Function Minimization," *The Computer Journal*, vol. 7 (4), 1965, pp. 308-313.
Ozisikyilmaz et al., "Efficient System Design Space Exploration Using Machine Learning Techniques," *Proceociings of The Design Automation Conference (DAC)*, Jun. 2008, pp. 966-969.
Palmero et al., "ReSPIR: A Response Surface-Based Pareto Iterative Refinement for Application-Specific Design Space v Exploration", IEEE on Computer-Aided Design of Integrated Circuits and Systems, Vol, 28, No. 12, Dec. 2009, pp. 1816-1829.
Peng et al., "PSO for Solving RCPSP", Chinese Control and Decision Conference, 2008, 5 pages.
Ribler et al. "Autopilot: Adaptive Control of Distributed Application," *Proceedings of the 7th IEEE Symposium on High-Performance Distributed Computing*, Jul. 1998, Chicago, Illinois.
Russe et al. *Artificial Intelligence: A Modern Approach*, 2003, Prentice Hall.
Russell et al., "NITELIGHT: A Graphical Tool for Sematic Query Construction," in *Semantic Web User Interaction Workshop (SWUI)*, 10pp., Florence, Italy (Apr. 2008).

Simpson et al, "Metamodels for Computer-based Engineering Design: Survey and Recommendations", Engineering with Computers 17, pp. 129-150, 2001.
Stanford Center for Biomedical Informatics Research, "The Protégé Ontology Editor and Knowledge Acquisition System," 1pg. http://protege.stanford.edu/ (accessed Jun. 2010).
Taylor et al. *Smart (Enough) Systems*, Prentice Hall, Boston, MA (2007).
Thonangi et al, "Finding Good Configurations in High-Dimensional Spaces: Doing More with Less", IEEE International Symposium on Modeling, Analysis and Simulation of Computers and Telecommunication Systems, 2008.
Weiss et al. *Computer Systems That Learn*, Morgan Kaufmann, San Mateo, CA (1991).
Xi et al, "A Smart Hill-Climbing Algorithm for Application Server Configuration", WWW2004, May 17-22, 2004.
Yahoo! Inc., "Pipes: Rewire the Web," No Date Given. http://pipes.yahoo.com/pipes/ (accessed Jun. 2010).
Yilmaz et al., "Main Effects Screening: A Distributed Continuous Quality Assurance Process for Monitoring Performance Degradation in Evolving Software Systems", ICSE, 2005, 10 pages.
Yoo et al. "Constructing a Non-Linear Model with Neural Networks for Workload Characterization," *Proceedings of the 2006 IEEE international Symposium on Workload Characterization*, Oct. 2006, pp. 150-159, San Jose, California.
U.S. Appl. No. 12/684,065, Final Office Action, dated Feb. 13, 2012, 20 pages.
U.S. Appl. No. 12/684,065, Final Office Action, dated Apr. 4, 2013, 26 pages.
U.S. Appl. No. 12/684,065, Non-Final Office Action, dated Oct. 7, 2011, 18 pages.
U.S. Appl. No. 12/684,065, Non-Final Office Action, dated Oct. 18, 2012. 28 pages.
U.S. Appl. No. 12/684,065, Notice of Allowance dated Sep. 11, 2013, 9 pages.
U.S. Appl. No. 12/714,206, Final Office Action, dated Apr. 10, 2013, 13 pages.
U.S. Appl. No. 12/714,206, Non-Final Office Action, dated Dec. 28, 2012, 14 pages.
U.S. Appl. No. 12/749,224, Non-Final Office Action, dated Nov. 9, 2011, 15 pages.
U.S. Appl. No. 12/749,224, Notice of Allowance, dated Jul. 11, 2012, 8 pages.
U.S. Appl. No. 12/827,068, Final Office Action, dated May 24, 2013, 13 pages.
U.S. Appl. No. 12/827,068, Non-Final Office Action, dated Jun. 8, 2012, 12 pages.
U.S. Appl. No. 12/846,684 Non-Final Office Action dated Oct. 21, 2013, 25 pages.
U.S. Appl. No. 12/846,684, Final Office Action, dated Mar. 1, 2013, 31 pages.
U.S. Appl. No. 12/846,684, Non-Final Office Action, dated Aug. 21, 2012, 24 pages.
U.S. Appl. No. 13/149,663 Non Final Office Action dated Aug. 19, 2013, 18 pages.
U.S. Appl. No. 13/149,663, Non-Final Office Action, dated Feb. 19, 2013, 15 pages.
U.S. Appl. No. 12/827,068 Non-Final Office Action dated Dec. 19, 2013, 13 Pages.
U.S. Appl. No. 12/846,684 Final Office Action dated Mar. 14, 2014, 35 pages.
U.S. Appl. No. 13/149,663 Final Office Action dated Jan. 2, 2014, 23 pages.
U.S. Appl. No. 13/149,701 Non-Final Office Action dated Mar. 11, 2014, 14 pages.
Notice of Allowance for U.S. Appl. No. 13/149,663 dated Sep. 30, 2014, 13 pages.
Notice of Allowance for U.S. Appl. No. 12/846,684 dated Oct. 7, 2014, 11 pages.
Final Office Action for U.S. Appl. No. 12/714,206 dated Dec. 3, 2014, 12 pages.
U.S. Appl. No. 12/714,206 Non-Final Office Action dated Jun. 19, 2014, 12 pages.

(56) References Cited

OTHER PUBLICATIONS

U.S. Appl. No. 13/149,663, Non Final Office Action dated May 16, 2014, 31 pages.
U.S. Appl. No. 13/149,701, Notice of Allowance dated Jul. 30, 2014 14 pages.
Non-Final Office Action for U.S. Appl. No. 14/107,991 dated Jul. 23, 2015, 15 pages.

* cited by examiner

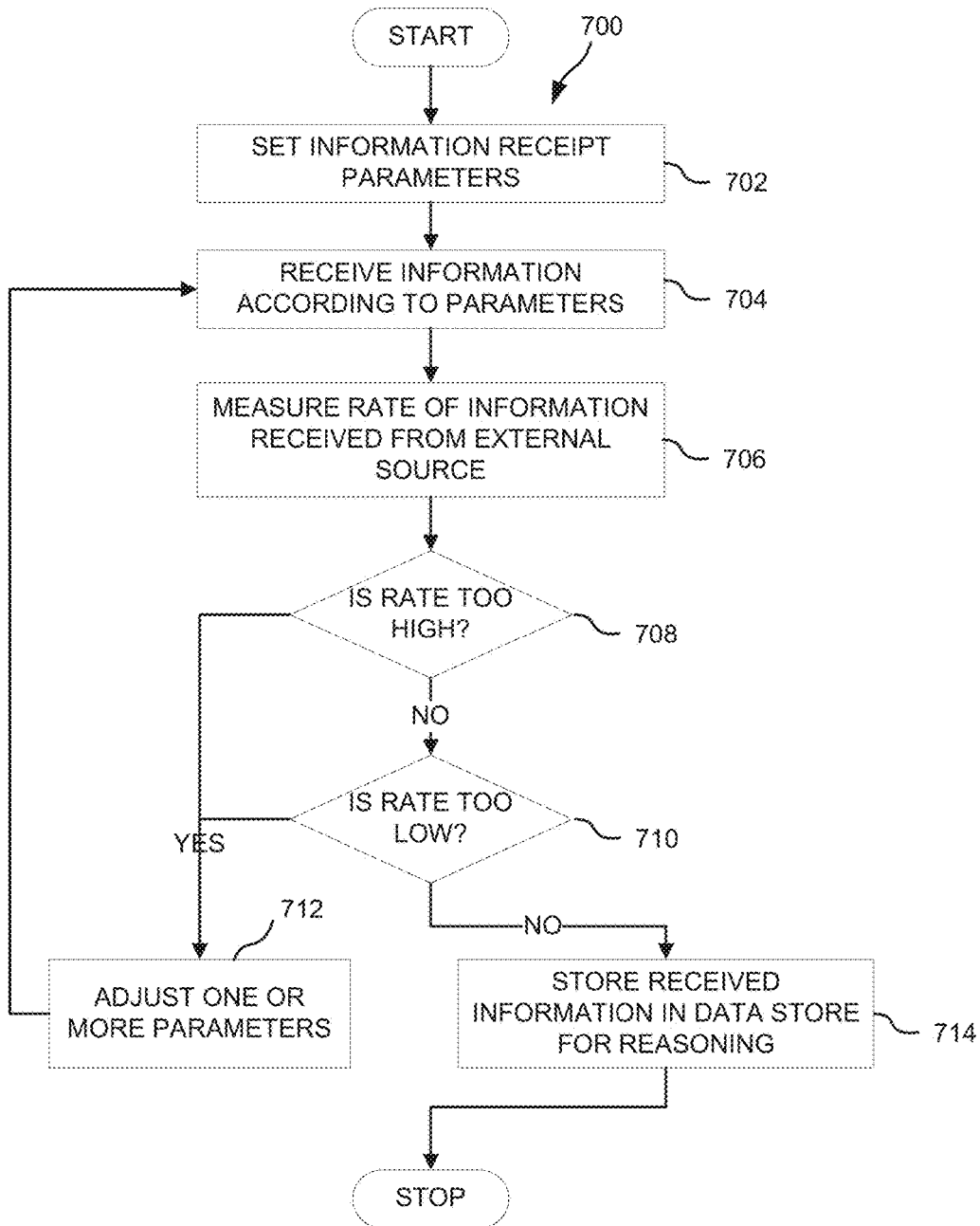

TECHNIQUES FOR ANALYZING DATA FROM MULTIPLE SOURCES

CROSS-REFERENCES TO RELATED APPLICATIONS

This application is a continuation, and claims the benefit and priority of of U.S. patent application Ser. No. 12/846,684, filed on Jul. 29, 2010, entitled "TECHNIQUES FOR ANALYZING DATA FROM MULTIPLE SOURCES," now U.S. Pat. No. 8,949,236, the entire contents of which is hereby incorporated by reference in its entirety for all purposes.

BACKGROUND OF THE INVENTION

Embodiments of the present invention relate to policies, and more specifically to techniques for enforcement of policies that utilize information from information sources external to an organization.

The operations of an organization, such as a business, can be quite complex. This complexity creates numerous situations in which activity harmful to the organization can occur. Mistakes and/or fraud can cause an organization significant losses and can subject the organization to incur unnecessary risk. For example, employee fraud can cause an organization to lose money. Misuse of an organization's manufactured products may result in exposure to lawsuits by consumers as well as adverse effects to the organization's image among the consuming public. Even unintentional data entry errors can cause use of significant resources for correction of both the errors and the effects caused by them. In addition to activities within an organization causing harm or subjecting the organization to risk, activities outside of an organization can also have similar effects. The sale of counterfeit goods, for instance, can cause significant effects on an organization's revenue. Grey market goods (goods purchased abroad and sold for less than they could be sold for domestically) can have similar effects on an organization's revenue.

Organizations often invest in various tools to detect activities that can be harmful to their business. The data generated and used by the various systems of an organization, for example, can be monitored in order to quickly detect and address policy violations, thereby minimizing the amount of harm caused by such activities. Various techniques are used to detect unauthorized transactions, to detect unauthorized access to sensitive data and/or systems, and generally to ensure that employees and systems are behaving within allowable parameters. Organizations also spend a significant amount of resources monitoring outside activities, such as the sale of their goods (or of goods purported to be of the organizations) on online auction websites and in other places. Outside activities harmful to an organization can be identified and, if appropriate, stopped, through the use of various techniques and legal processes.

While current techniques for monitoring both internal and external activities can be useful, various complexities and other factors may limit their effectiveness. The Internet, for example, is a vast and complex resource, comprising information sources provided by numerous entities. An organization that sells goods, for instance, may have its products counterfeited and sold through numerous online channels. In addition, activities that are harmful to an organization may not be entirely internal or external, but may involve activities by the organization's employees as well as by others outside the organization, such as by vendors.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques for enforcing policies using information provided from a source external to an organization. In one embodiment a computer-implemented method of detecting violations of policies of an organization is disclosed. The method, in an embodiment, is performed under the control of one or more computer systems configured with executable instructions and includes receiving external information from one or more external information sources; receiving internal information from one or more internal information sources; storing the external information and internal information in one or more data stores that collectively implement one or more ontologies; applying one or more conditions to the external information and internal information in the one or more data stores to determine a conclusion; and providing the conclusion.

In an embodiment, receiving the external information includes receiving first external information from a first external information source, receiving second external information from a second external information source, and converting at least one of the first external information and second external information to a common format. The method may include converting the received internal information to the common format. In one embodiment, the method includes specifying one or more parameters for at least a portion of the external information; measuring a rate of external information receipt; and when the rate deviates from a range of acceptable values, adjusting one or more of the parameters to modify the rate. The one or more external information sources may include a website offering for consumption an item purporting to be from the organization. Applying the one or more conditions to the external information and internal information may include performing a statistical analysis on the external information and internal information to determine one or more statistical measurements relating at least a portion of the external information to at least a portion of the internal information. The one or more conditions, in an embodiment, are based at least in part on the one or more statistical measurements. The one or more statistical measurements may include a particular statistical measurement that relates one or more transactions of the organization with one or more activities of a vendor of the organization.

In another embodiment, a computer-readable storage medium having stored thereon instructions for causing at least one computer system to detect policy violations for an organization is provided. In an embodiment, the instructions comprise: instructions that cause the at least one computer system to receive external information from one or more external information sources; instructions that cause the at least one computer system to receive internal information from one or more internal information sources; instructions that cause the at least one computer system to store the external information and internal information in one or more data stores that collectively implement one or more ontologies; instructions that cause the at least one computer system to apply one or more conditions to the external information and internal information in the one or more data stores to determine a conclusion; and instructions that cause the at least one computer system to provide the conclusion.

The instructions that cause the at least one computer system to receive external information may include: instructions that cause the at least one computer system to receive first external information from a first external information source; instructions that cause the at least one computer system to receive second external information from a second external information source; and instructions that cause the at least one computer system to convert at least one of the first external information and second external information to a common format. In addition, instructions that cause the at least one computer system to convert the received internal information to the common format may be included. In an embodiment, the computer-readable storage medium includes instructions that cause the at least one computer system to specify one or more parameters for at least a portion of the external information; instructions that cause the at least one computer system to measure a rate of external information receipt; and instructions that cause the at least one computer system to, when the rate is above a threshold, adjust one or more of the parameters to reduce the rate. The one or more external information sources may include a website offering for consumption an item purporting to be from the organization. In addition, the instructions that cause the at least one computer system to apply the one more conditions to the external information and internal information may include instructions that cause the at least one computer system to perform a statistical analysis on the external information and internal information to determine one or more statistical measurements relating at least a portion of the external information to at least a portion of the internal information. The one or more conditions may be based at least in part on the one or more statistical measurements. The one or more statistical measurements may include a particular statistical measurement that relates one or more transactions of the organization with one or more activities of a vendor of the organization.

In another embodiment, a system for detecting policy violations for an organization is disclosed. The system, in an embodiment, includes: one or more communications devices collectively operable to receive external information from one or more external information sources and internal information from one or more internal information sources; a data store that receives at least a portion of the internal information and at least a portion of the external information, that transforms said at least a portion of the internal information and said at least a portion of the external information to a common schema that implements an ontology; and one or more computing devices. The one or more computing devices, in an embodiment are collectively operable to: apply one or more conditions to contents of the data store to determine a conclusion, the contents including said at least a portion of the internal information and said at least a portion of the external information; and provide the conclusion. The ontology may be based at least in part on a plurality of user-defined semantic objects and a plurality of user-defined relationships among the semantic objects.

In an embodiment, the one or more computing devices are operable to specify one or more parameters for receipt of the external information; measure a rate of external information receipt; when the rate deviates from a range of acceptable values, adjust the one or more parameters to modify the rate; and cause the one or more communications devices to receive external information according to the adjusted parameters. The one or more information sources may include a website offering for consumption an item purporting to be from the organization. In an embodiment, the one or more computing devices are collectively operable to apply the one or more conditions to the external information and internal information by performing a statistical analysis on said at least a portion of the external information and said at least a portion of the internal information to determine one or more statistical measurements relating at least a portion of the external information to at least a portion of the internal information. The one or more conditions may be based at least in part on the one or more statistical measurements. The one or more statistical measurements may include a particular statistical measurement that relates one or more transactions of the organization with one or more activities of a vendor of the organization.

For a fuller understanding of the nature and advantages of the present invention, reference should be made to the ensuing detailed description and accompanying drawings.

BRIEF DESCRIPTION OF THE DRAWINGS

FIG. 7 shows a method for controlling the flow of data from external information sources in accordance with an embodiment.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
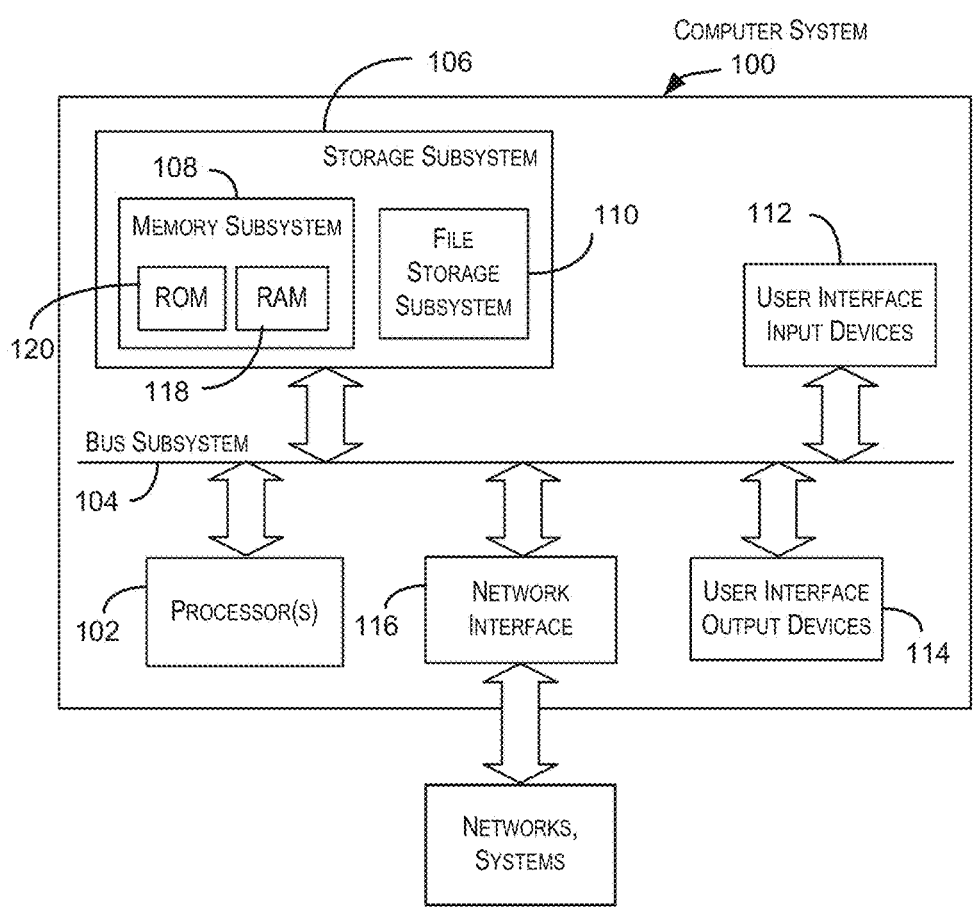
FIG. 1 is a simplified block diagram of a computer system that may be used to practice an embodiment of the present invention.

FIG. 1 is a simplified block diagram of a computer system 100 that may be used to practice an embodiment of the present invention. Computer system 100 may serve as a processing system and/or a client system depicted in FIGS. 2 and 3. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to define parameters for analysis that involves data from internal and external sources, as discussed below.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of analyzing both internal and external data and other information relevant to the user's use of embodiments of the present invention may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read-only memory (ROM) 120 in which fixed instructions are stored. File storage subsystem 110 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
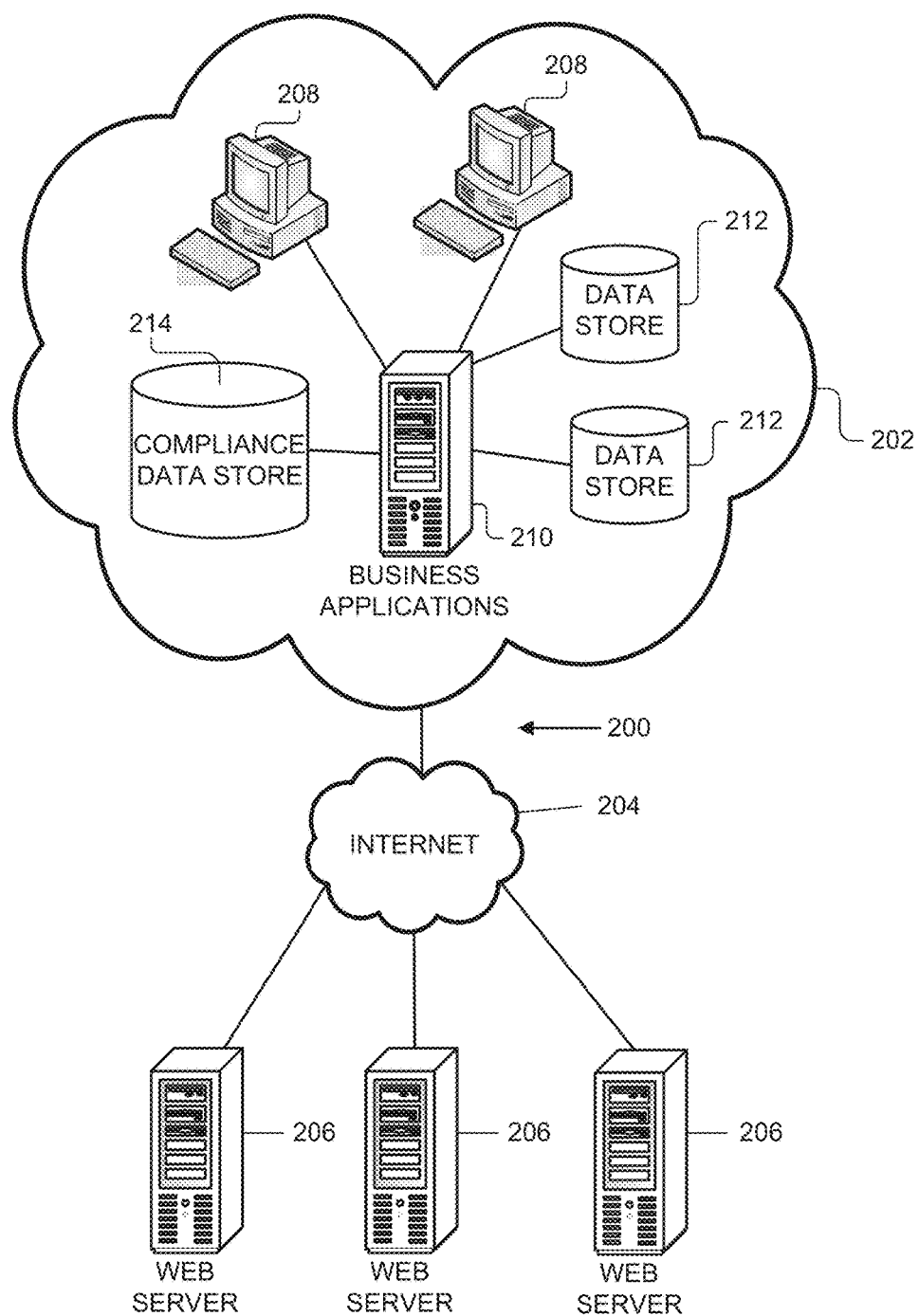
FIG. 2 illustrates an environment in which various embodiments of the invention may be practiced.

FIG. 2 shows an environment 200 in which an embodiment of the invention may be practiced. Components of the environment 200 shown in FIG. 2 may include one or more elements from the computer system shown in FIG. 1 or variations thereof. In an embodiment, the environment 200 involves an organization that utilizes various computing systems in its operations. These computing systems may be part of an internal network (intranet) 202. Many of the devices used in the intranet 202 may utilize data from devices sent over an external network, such as the Internet 204. Information provided via the Internet 204 may be sent to one or more of the devices of the intranet 202 by various web servers 206, which may be operated by third parties. For example, a web server may be utilized in order to provide pages of a website to users in the organization and to users in general. While, for the purpose of illustration, the environment 200 shows web servers 206 providing information to users of the organization via the internet, other devices capable of providing information over a communications network are contemplated as being within the scope of the present disclosure.

Turning to the intranet 202 of the organization, a plurality of user devices 208 are included. User devices may be, for example, computing devices utilized by employees of the organization such as desktop or notebook computers, mobile devices, tablet computers, and generally any device utilized in connection with an internal network of the organization. As shown in the figure, the user devices may be communicatively connected with one or more business applications 210, which may be operated on one or more internal servers of the organization. For the purpose of illustration, a single server is shown, although organizations often utilize multiple servers for their operations. Examples of business applications are applications for customer relationship management (CRM), human resources (HR), accounting, applications that operate internal websites, and applications that are used in order to monitor the organization's operations in order to reduce risk, detect fraud and/or mistakes, and generally ensure that the organization, its employees, and its systems are operating properly.

In an embodiment, business application 210 utilizes a plurality of data stores 212. A particular data store may be a database configured for a specific application such as for a CRM application or generally any application. Each data store 212 may utilize one or more corresponding schemas and different data stores may utilize different schemas. For example, a CRM application may utilize one schema while an HR application may utilize another schema. Use of different schemas may be for various reasons. Software from one software provider may utilize its own proprietary schema. Schemas for certain applications may utilize schemas specifically configured for performance reasons. Organizations may utilize their own schemas specifically adapted for the organization. Custom built applications may utilize a different schema simply due to design choices of one or more programmers. Example schemas include relational database schemas, extensible markup language (XML) schemas, flat file schemas, lightweight directory access protocol (LDAP) schemas, and generally any schema which may be utilized by an application for the organization of data relevant to the application.

As noted above, the business applications 210 may include one or more applications for monitoring the various systems of an organization. Such applications may operate analyzing data generated during operations of the various applications. However, monitoring the data of the various applications may cause a decrease in performance for those applications. For instance, the speed of an application may slow if data used by the application is concurrently being accessed by a monitoring application unless appropriate measures are taken. Accordingly, in one embodiment, the intranet includes a compliance data store 214 that includes data from the various other data stores of the organization. The compliance data store 214, in an embodiment, is a data store which includes data from one or more of the various data stores 212 utilized by business applications. The compliance data store 214 may also include data from various external information sources such as from the web servers 206, as described in more detail below. While, for the purpose of illustration, a single compliance data store 214 may be used, more than one compliance data store 214 may be used. For instance, data used for monitoring may be stored in a distributed manner across several data stores.

While FIG. 2 shows a particular environment 200 for the purposes of illustration, variations are contemplated as being within the scope of the present disclosure. For instance, the intranet 202 and Internet 204 are shown in a simplified arrangement. Typically networks include other devices, such as switches, firewalls, servers, and other devices not shown. In addition, organizations may have multiple geographic locations and, as a result, an organization's network may include components that communicate with one another over the Internet or other communications networks. Also, while organizations often own and maintain their own servers and other devices, many aspects of an organization's activities may be performed in connection with devices in a cloud environment. For instance, an organization may utilize applications hosted by third parties and may utilize databases operated by third parties in addition to or as an alternative to using one's own devices. In addition, an organization may maintain an internal data store using hardware operated by a third party.

Figure 3:
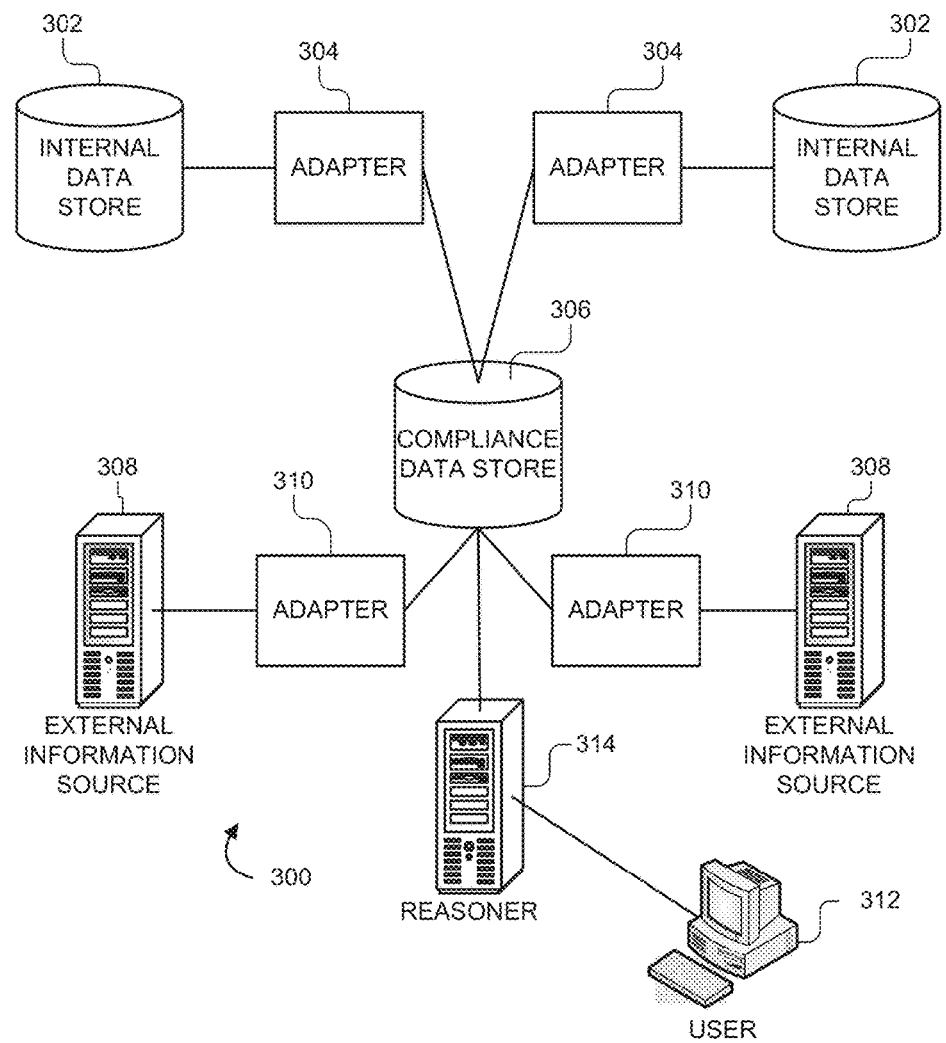
FIG. 3 illustrates an environment for analyzing data from multiple sources which may be part of the environment shown in FIG. 2 in accordance with an embodiment.

FIG. 3 shows an environment 300 demonstrating how data from the various data stores of an organization, as well as from external information sources, are brought into a central data store for compliance monitoring, such as the compliance data store 214 described above in connection with FIG. 2. As discussed, an organization may utilize various internal data stores 302 for its business applications. In an embodiment, adaptors 304 are used to store data from the internal data stores 302 in a compliance data store 306. In an embodiment, an adaptor includes a data mapping from one schema to another. The mapping may be implemented in hardware and/or may be implemented as software executing according to executable instructions. Adaptors for internal data stores may define extract, transform, and load (ETL) transformations that extract data from an internal data store, transform the data from the internal data store into a schema utilized by a compliance data store, and load the transformed data into the compliance data store.

In the example shown, the adaptors 304 map schemas from the internal data stores 302 to a schema of a compliance data store 306. As discussed, the schemas of the internal data stores 302 may be of several different types, such as a relational database, LDAP, XML, flat file, and the like. In an embodiment, the compliance data store utilizes a schema which models an ontology of the organization. As used herein, an ontology is a formal representation of data and relationships among the data. In an embodiment, the ontology modeled by the compliance data store 306 is defined by terms commonly used in the organization and relationships between those terms. For instance, in an embodiment, an ontology represents (among other things) invoices and line items of the invoices, and the relationships between them. Similarly, an ontology may represent employees and their relationships among one another, such as managers and non-managers. A manager of a group of people, for instance, may be represented in an ontology in a manner that indicates that the manager manages the group of people. In an embodiment, the compliance data store utilizes an Ontology Web Language (OWL) schema for data storage, although other schemas, such as XML schemas and relational database schemas, may be used. The specific details of the schema may be defined by a user according to the particular semantic objects used by an organization of the user.

Often semantic objects, such as people, are represented differently in different data stores. For instance, an employee may be represented by a unique identifier in one data store and by another unique identifier in another data store. In an embodiment, the adaptors 304 map common semantic objects to the same instance of an element of a schema modeling the ontology. As an example, an employee identified by one identifier in one data store and another identifier in another data store may be mapped to the same instance of an "employee" element of a schema used to model an ontology. Similarly, the relationships among data in their native sources may be preserved in the compliance data store. For instance, if an invoice is related to an employee in a data store used for accounting records, data corresponding to the invoice and the employee, in an embodiment, would be related to one another in a similar manner in the compliance data store. If the same employee is related to a purchase order, as reflected in another data store, the compliance data store may store data corresponding to the employee and purchase order reflecting their relationship. In this manner, the invoice and purchase order may be seen as related to the same employee in the compliance data store, even though data corresponding to the invoice and the purchase order are normally stored in separate data stores. This enables the analysis of data from disparate data stores in a manner that represents relationships among the data that otherwise may not be apparent by analyzing the disparate data stores separately.

As shown in the figure, an environment 300 also includes a plurality of external information sources 308, which may be, for example, web servers such as those described above or, generally, data stores maintained by third parties. Information from the external information sources is stored in the compliance data store 306 using one or more adapters 310, as described in more detail below. In an embodiment, the adapters 310 map data in external schemas to a schema utilized by the compliance data store 306. With data in the compliance data store 306, a user 312 may operate a reasoner 314 in order to analyze data in the compliance data store 306, according to directions provided by the user. In an embodiment, a reasoner (often referred to as a reasoning engine or rules engine) is an application that applies a set of rules to a set of data to infer a set of one or more logical consequences from the data. A reasoner may be implemented as a set of executable instructions stored on a computer-readable storage medium and/or may be implemented as hardware configured to execute the instructions. A reasoner may employ transitive reasoning in order to infer relationships among data of an organization. A reasoner may also perform statistical calculations on data, such as by calculating correlations among data, averages, means, and generally any calculation that is suitable for a particular purpose. An example of a reasoner and how it may be directed using user input is described in U.S. patent application Ser. No. 12/714,206, filed Feb. 26, 2010, which is incorporated herein by reference for all purposes. Any suitable reasoner may be used.

Figure 4:
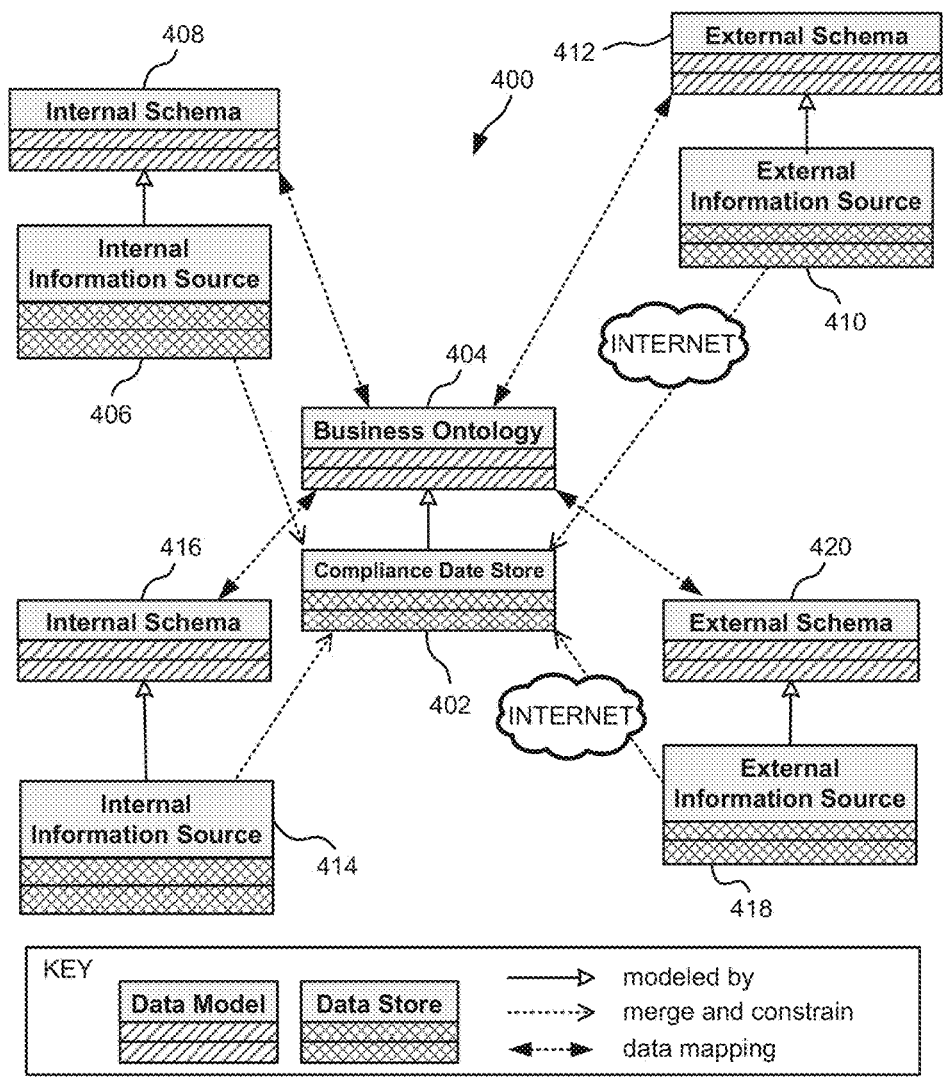
FIG. 4 shows a diagrammatic representation of aggregation of data from multiple sources in accordance with an embodiment.

FIG. 4 shows a representation 400 demonstrating how data may be stored in a compliance data store 402 which may be similar to the compliance data store described above. As shown in the drawing, a business ontology 404 is modeled by the compliance data store 402. In this manner, relationships among semantic objects in the business ontology are preserved by the manner in which data is stored in the compliance data store. For example, a specific invoice and a line item of the invoice may be stored in the compliance data store 402 in order to represent the relationship of the line item to the invoice according to relationships defined for the business ontology. Similarly, if the business ontology specifies that salespeople are in an employee class, data identifying salespeople are shown as belonging to the employee class.

Turning to specific examples shown in the figure, various schemas are modeled by corresponding information sources. For instance, as shown in the figure, an internal information source 406 is modeled by an internal schema 408. In this example, the internal schema 408 is mapped to the business ontology 404 by an adaptor. The adaptor, then, is utilized in order to store information from the internal information source 406 into the compliance data store according to the adaptor. It should be noted that all information from the internal information source 406 may not be stored in the compliance data store 402, in order to reduce the amount of data moved into the compliance data store 402. As one example, if the internal information source 406 includes documents, only the titles of the documents may be stored in the compliance data store 402, whereas the contents of the documents themselves may not. As another example, if the internal schema is a relational database schema comprising a plurality of relational tables, only portions of the tables may be stored in the compliance data store.

In an embodiment, information is provided from an external information source 410 according to an external schema 412. The external schema may, for instance, be an XML schema or other schema. An illustrative example of information provided according to an external schema is provided in FIG. 5. One or more adapters may convert information from the external information source 410 into a format suitable for the compliance data store 402. Information from an external information source may be information available through a website associated with the external information source, may be sent according to calls of an application programming interface (API) of the external information source, or may be provided for storage in the compliance data store 402 in any suitable manner. Further, as with the internal information sources, less than all information received from an external information source may be stored in the compliance data store.

In order to illustrate various embodiments of the invention, FIG. 4 also shows that mappings may be used to store data from multiple internal data sources and multiple external sources into a compliance data store. Specifically, FIG. 4 shows another internal schema 416 modeled by another internal information source 414 and another external schema 420 modeled by another external information source 418. The internal schemas, as noted above, may utilize their own schemas, but be mapped to a common schema that encodes the business ontology 404. Likewise the external schemas may be different, but mapped to a common schema that encodes the business ontology 404. While FIG. 4 shows two internal schemas and two external schemas mapped to the business ontology 404, there may be fewer or more than two internal schemas and/or fewer or more than two external schemas.

Figure 5:
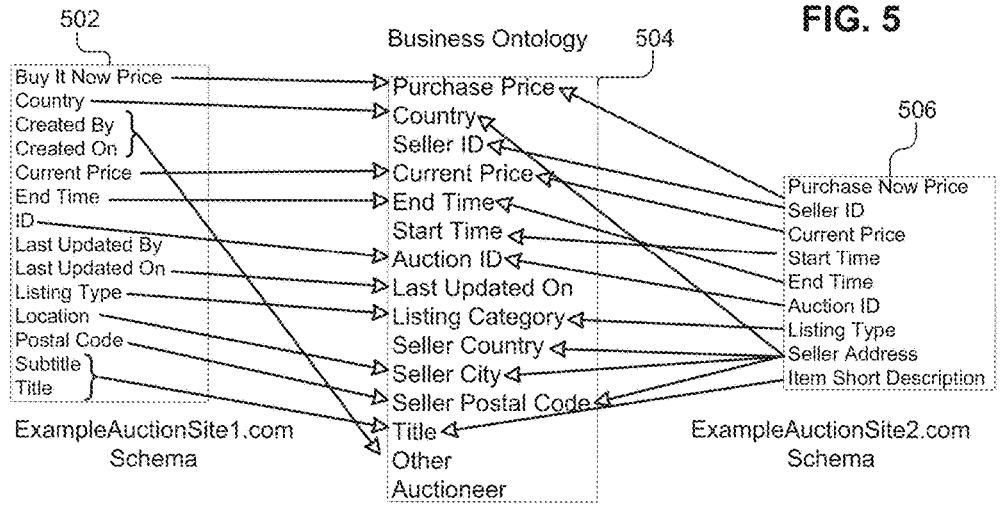
FIG. 5 shows a representation of a mapping of multiple external information sources to a business ontology in accordance with an embodiment.

As noted, FIG. 5 provides an illustrative example of how information from external information sources may be mapped to a schema used to encode a business ontology. In this specific example, information related to online auctions is provided from two online auction sites according to two corresponding schemas. The elements of the schemas used by the auction sites are mapped to a schema encoding the business ontology, in accordance with an embodiment. For instance, FIG. 5 shows a first auction item element 502 of a schema utilized by a first auction site. In this example, the auction item element 502 includes a plurality of sub-elements that correspond to information often available for auction items. For instance, the auction item element 502 includes a "Buy It Now Price" which may be a price at which consumers may purchase an item, bypassing an actual auction. Accordingly, the "Buy It Now Price" element is mapped to a "Purchase Price" element of an auction item element 504 of the business ontology. Similarly, a "Country" sub-element (which may correspond to the country in which an item up for auction is located) is mapped to a "Country" sub-element of an auction item element of the business ontology 504. Because the elements of an external schema may not be arranged exactly as the elements of an ontology, the mapping may not be one-to-one. For example, in this illustrative example, the first auction item element 502 includes both "Subtitle" and "Title" elements, where the "Subtitle" element may be associated with fuller descriptions of items than what is typically found in instances of the "Title" element. However, the Business Ontology in this example only includes a "Title" element. In this example, this is remedied by mapping both the "Subtitle" and "Title" elements to the "Title" element of the auction item element 504 of the Business Ontology. Similarly "Created By" and "Created On" elements of the first auction item element 502 are mapped to an "Other" element of the auction item element 504 of the ontology since corresponding elements are not otherwise found as sub-elements of the auction item element. In some instances, not all elements of a schema may be mapped to the business ontology. For instance, as shown, the first auction item element 502 includes a "Last Updated By" element which is not mapped to any element of the ontology.

In an embodiment, in this example, an organization may receive instances of the first auction item element 502 from third party auctioneers, where an instance of an element is a set of data organized according to the element. For example, an instance of the first auction item element 502 may include data corresponding to an actual item being auctioned in an online auction, where the data is arranged according by the schema of which the first auction element 502 is a part. Thus an instance of the first auction item element 502 may include data including a price at which the item may be purchased bypassing the auction, an identifier of the auction, an end time of the auction, a title for the auction item, and the like. This data, to the extent corresponding sub-elements are mapped to the business ontology, may be stored in a compliance data store in a manner that models the business ontology. In this example, the compliance data store may include instances of auction item elements that have the data arranged according to the ontology, which may differ from the arrangement received from the external information source. The business ontology, in this example, may also include elements for auctioneers (operators of online auction sites) and may store instances of auction items in a manner indicating to which auctioneer the items are associated.

As shown in the illustrative example of FIG. 5, auction item elements from another schema may be mapped to the auction item element 504 of the business ontology. For instance, a second auction item element 506 may correspond to a schema utilized by another online auction site to arrange data associated with its own auction items. In this example, the second auction item element 506 includes a "Purchase Now Price" which is mapped to the "Purchase Price" discussed above, as are other elements as shown in the drawing. Also illustrated with this element is a "Seller Address" element that does not correspond exactly to a corresponding element of the business Ontology. Computer logic may be used in order to parse actual addresses and store them in an arrangement specified by the business ontology 504. For instance, an address may be analyzed and data corresponding to a postal code may be stored as an instance of a "Seller Postal Code" element of the business ontology, data corresponding to a country may be stored as an instance of a "Country" element of the business ontology, and the like.

In this manner, items from disparate external information sources are stored in a manner that provides for effective analysis of the data. For instance, if a seller of retail goods desired to detect when counterfeit goods were being passed off as goods of the seller, a user at the seller may direct an application to analyze the data in the compliance data store for items having a purchase price below some threshold. Results of this analysis may be provided to the user who may then take appropriate action, such as legal action against the seller of likely counterfeit goods, or simply further investigation. In this manner, analysis of one set of data is achieved, thereby improving resource efficiency.

Further, embodiments of the present invention provide other advantages. As an example, because data relating to similar semantic objects (auction items, e.g.) from disparate external sources is stored according to a common schema, additional analysis that is otherwise difficult may be achieved. For instance, statistical analysis that involves data from disparate external sources is relatively straightforward since users may define how analysis should proceed without having to learn multiple schemas for each source of information. In addition, statistical analysis that involves both internal and external data may be performed in a straight forward manner. For instance, users can define analysis to be performed on both internal data and external data without having to learn the different schemas of an organization and of the external sources.

In one specific example, a reasoner may be instructed by a user through user input to locate items on online auction sites that have titles similar to names of inventory items and that have purchase prices that are below at least a threshold amount. A reasoner may then use appropriate algorithms to locate, according to one or more rules, inventory item names that are similar to auction item titles, and from those, auction items with the low purchase prices. As another example, a government agency may provide an electronic list of suspected terrorists to whom certain items are prohibited by law to be sold. The government agency may periodically update the list. Internal data in a compliance data store corresponding to buyers may be checked against a current version of the government-provided list and, if a buyer matches an identity on the list, a sale may be stopped or at least temporarily halted while further investigation and/or approval from proper persons is obtained.

As yet another illustrative example of advantages provided by embodiments of the present invention includes the sale of pharmaceutical products and other products having expiration dates. Specifically, an organization that sells such products may utilize embodiments of the present invention to detect instances of expired products or products about to expire being offered for sale. For instance, an organization's internal compliance data store may include information relating to invoices, such as product identifiers, quantities sold, expiration dates, and the like. The information in the compliance data store, in an embodiment, is stored in a manner reflecting semantic relationships among the items. The compliance data store may also receive information from one or more third party websites that offer the organization's products for consumption. The data in the compliance data store may be analyzed to detect correlations that may indicate unauthorized and/or potentially harmful activity. For instance, if a product typically expires after a certain time period after sale (such as one year), data in a compliance data store may be analyzed to determine if there is a correlation between sales to particular buyers and the appearance of the sold items on auction sites. A strong correlation may indicate that the buyer has not sold all of the products he or she has purchased from the manufacturer and, therefore, is selling excess inventory that is about to expire. The buyer, then, may be investigated in order to determine whether corrective action should be taken. Generally, data received from external sources may be analyzed with data from internal sources to determine correlation values between various measurements. Correlations may indicate a relationship between activities internal to the organization and activities external to the organization. As yet another example, pattern recognition techniques may be used to detect abnormal activity within an organization and abnormal activity with respect to the organization's products as offered for consumption in an electronic environment. Correlations between instances of abnormal activity may signify fraud perpetuated by an employee of the organization.

Generally, data corresponding to internal activities of an organization may be analyzed with data corresponding to activities external to an organization in numerous ways and the analysis may be as sophisticated as users dictate. An interface for allowing users to customize analysis of data may be similar to embodiments of the interface described in U.S. patent application Ser. No. 12/714,206, filed Feb. 26, 2010, noted above. In this manner, users can design analysis of an organizations internal data and data relating to activities external to the organization in any suitable manner according to the needs of the organization.

Figure 6:
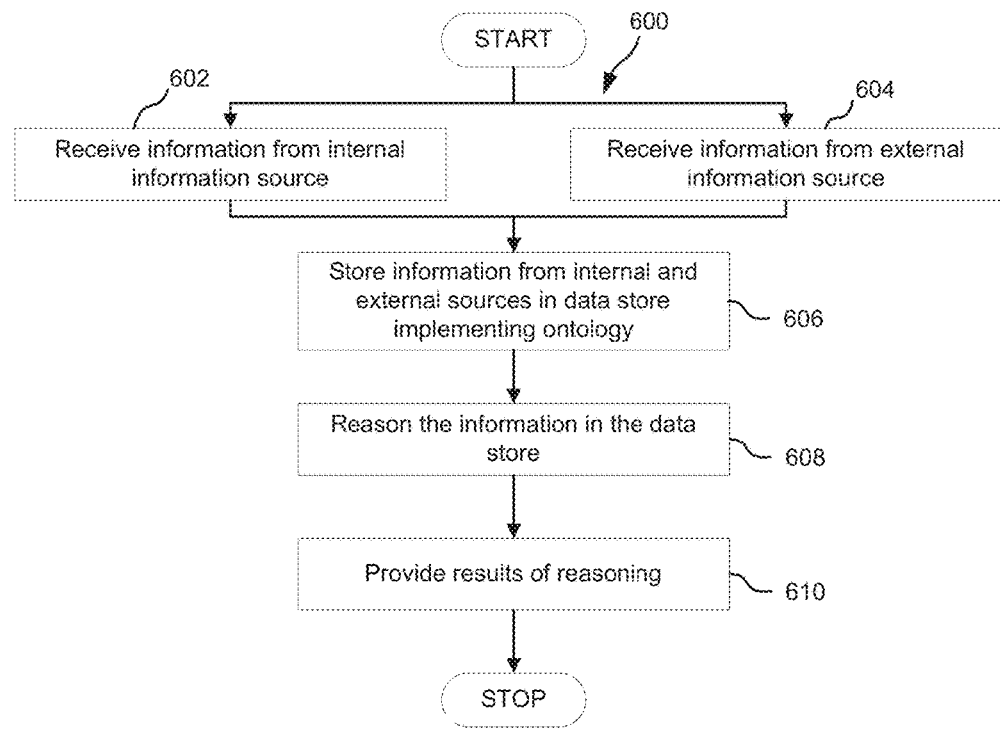
FIG. 6 shows a method for analyzing data from multiple sources in accordance with an embodiment.

FIG. 6 shows a diagrammatic representation of a process 600 for analyzing data from both internal and external information sources in accordance with an embodiment. The process 600, or any process described herein, or variations thereof, may be performed under the control of one or more computer systems configured with executable instructions. Executable instructions may exist as code stored on one or collectively on more computer-readable storage media. In an embodiment, information from one or more internal information sources is received 602 in accordance with an embodiment. Receipt of information from the one or more internal information sources may be performed, for example, by one or more adapters that map a schema utilized by an internal data store to a schema of another data store in which the received information is stored. Similarly, information from one or more external information sources is received 604 in accordance with an embodiment. Receipt of the information from the external information source may also utilize one or more appropriate adapters. In addition, receipt from an external information sources may be performed in various ways, which may depend on how operators of the external information sources decide to provide information. As one example, an external information source publishes, sells, or otherwise provides an application programming interface (API) that allows an organization's devices to request information and/or provide parameters for the request. In this example, a user device may send an electronic message to a device (such as a web server) of the external information source according to a format accepted by the external information source. The external information source would then, in an embodiment, provide over a network information that is responsive to the received message according to any specified parameters. As a specific example, an organization's device may send a message to a web server of an online auction site requesting all pending auction items whose titles include certain keywords and that have auction bypass prices below a specified amount. The web server would then provide information that satisfies the request, which the organization could store in a compliance data store, as discussed above.

As another example, a user device may simply make standard hypertext transfer protocol (HTTP) requests to a web server providing a website of an external information source and information received may be analyzed and subsequently stored in an appropriate data store. As an example, uniform resource locators (URLs) of auction sites may utilize their own schema where keyword search terms and/or other parameters are embedded into the URL. An HTTP request according to the URL schema may be made to the web server of an auction site and a hypertext markup language (HTML) document may be provided by the web server in response. The HTML document may contain a list of items for auction satisfying the parameters. Data may be taken (scraped) from the HTML document and stored appropriately. An organization's system may, if appropriate, request other documents, such as additional pages of results if the auction site provides only a portion of all items responsive to the query at a time.

According to yet another example, an organization may have an arrangement with an operator of an external information source where the operator provides information according to the arrangement (which may specify one or more criteria for information to be provided). Providing the information may be performed according in any suitable manner, such as by periodically sending electronic documents to the organization. In this manner, information is "pushed" to the organization. Generally, any suitable manner of receiving information from external information sources may be utilized. In instances where information from multiple external information sources is received, different external information sources may provide respective information differently.

As shown in the diagram, information from the internal external information sources may be received at various times, not necessarily sequentially. In addition, information may be received periodically or at other times and not necessarily as a discrete step during performance of the process 600. In an embodiment, information received from the internal and external sources is stored in a data store that models an ontology according to user-defined semantic objects and user-defined relationships among the objects. For instance, the ontology may be a business ontology utilizing various concepts of a business and their relationships among each other, as described above.

In an embodiment, information from the data store is reasoned 608 and results of the reasoning are provided 610 to a user in accordance with an embodiment. Reasoning information in the data store may include analysis of the data in order to determine one or more conclusions based on one or more parameters. The reasoning may be performed pursuant to user-defined logic using an interface similar to embodiments of the interface described in U.S. patent application Ser. No. 12/714,206, filed Feb. 26, 2010, noted above. Reasoning may also be performed according to predefined logic. In an embodiment, results of reasoning are provided to a user in the form of a table having columns corresponding to user-defined specifications. As an example, if the reasoning is designed to detect invoices meeting certain criteria, a table of invoices satisfying the criteria may be provided. Each row may correspond to a corresponding invoice and the columns may correspond to user-specified attributes of invoices. For instance, a user may have defined logic to detect invoices that, according to some criteria, appear fraudulent. The user may also have specified that, for each invoice detected, he or she would like to view the total amount, the seller identity associated with the invoice, and the buyer identity associated with the invoice. When invoices are detected, transitive reasoning may be used to detect the other information specified by the user that is associated with the detected invoices. Generally, any suitable manner of providing results of reasoning to users may be used. Suitable methods include, but are not limited to, electronic messages with applicable information provided, graphics created based at least in part on the results, and others.

In some instances, information from various information sources, especially external information sources, may be unpredictable. For instance, in the example of online auction sites, the number of items of an organization (or purporting to be of an organization in the case of counterfeit goods) being auctioned at any given time may vary widely. On one day, an online auction site may have just a few items purporting to be from an organization while another day there may be thousands. For analyzing data, too little data may affect the accuracy of statistical calculations while too much data may cause strain on an organization's resources, such as computing resources and resources for investigating potential policy violations. Accordingly, embodiments of the present invention provide techniques for dealing with variations in the amount of data. FIG. 7, for example, shows a process 700 for controlling the flow of information from one or more information sources to a compliance data store model and an ontology in accordance with an embodiment. In an embodiment, information receipt parameters are set 702 where the information receipt parameters define one or more conditions for data to be received from one or more information sources. The parameters may be different for different information sources. In the example of an online auction site, for instance, parameters may specify that auction items having certain titles should be received. The parameters may also specify a price (such as a price for bypassing an auction, or a final bid price) that is below a particular amount, thereby indicative of possible counterfeit and/or grey market goods being offered. Generally, the parameters may be any set of parameters that may be modified in order to affect the amount of information that is received. Example parameters include, but are not limited to, keywords for keyword searches, ranges of values, maximum and/or minimum values, and generally any information that may be used to determine information that should be included or excluded from information to be received.

When the information received parameters are set, information is received 704 according to the parameters. In an embodiment, the rate of information received from external sources is measured 706. Measurement of the rate may be performed by measuring any statistic indicative of the amount of information being received such as the size of the information, the number of items received, and the like. Additional information may be received, such as information indicating how much information would be received if parameters were adjusted, information not satisfying, but closely satisfying the parameters according to one or more metrics, and the like.

In an embodiment, a determination is made 708 whether the rate is too high and, if the rate is not too high, a determination is made at 710 whether the rate is too low. It should be noted that, while the example process 700 shown in FIG. 7 shows a determination of whether a rate is too high performed as a step prior to determination to whether the rate is too low, other orders of such determinations may be made. Generally, while the steps of processes described herein are shown in a particular order for the purpose of illustration, other orders may be used unless clearly contradicted explicitly or by context. Also, a determination whether the rate is too high or too low may be made based at least in part on many different factors, such as computational resources, user specified values, and the like.

In an embodiment, if the rate of information received is too high or too low, one or more of the parameters for information received is adjusted 712 and information is received 704 according to the new parameters. As an example, current parameters may specify an intent to receive auction items relating to a particular product where the price is below a specified amount. Such parameters may be used to detect grey market and/or counterfeit goods. If such parameters result in too many items being received, the price may be lowered. In addition or as an alternative, an additional parameter may specify that items offered by sellers with certain characteristics should be received. The characteristics may be, for instance, sellers in a particular jurisdiction, sellers that offer for auction at least a minimum number of specified items, and the like. A user, for example, may simply decide that there are too many items being auctioned and that it would be burdensome to investigate them all. Therefore, the user may specify stricter parameters in order to focus on the more egregious instances of likely counterfeit and/or grey market goods. Similarly, parameters may be adjusted in order to receive more information, such as improving statistical accuracy, increasing the number of auction items (or other instances of schema elements), or generally to increase the amount of information received for any applicable purpose.

If the measured rate is not too high or too low, then information is stored 714 in a data store for reasoning. It should be noted that information may also be stored in the data store for reasoning even when the rate of information receipt is too high or too low, but that adjustment of the parameters may simply affect greater receipt of future information. For instance, if a current rate of information receipt may be acceptable, but parameters may be adjusted for the purpose of improvement.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of detecting violations of policies of an organization, comprising:
   receiving, by a computer system, information from one or more information sources;
   specifying one or more parameters for identifying the information;
   updating, by the computer system, an ontology model based at least in part on the information, the ontology model defining an association between the information and a data element in a database schema;
   applying one or more conditions, based at least in part on the ontology model, to detect at least one policy violation;
   identifying, based at least in part on the ontology model, one or more information sources associated with the policy violation; and
   providing an identification of the one or more information sources associated with the policy violation.

2. A computer-implemented method of claim 1, further comprising:
   measuring a rate of receipt of the received information, the rate of receipt indicative of a particular amount of the information being received from the one or more information sources;
   when the rate deviates from a range of acceptable values, adjusting at least one of the one or more parameters to modify the rate of the received information; and
   receiving the information according to the modified rate.

3. The computer-implemented method of claim 1, wherein receiving the information further comprises:
   receiving first external information from a first external information source, the first external information comprising first sub-elements;
   receiving second external information from a second external information source, the second external information comprising second sub-elements; and
   mapping the first sub-elements and the second sub-elements to the element in the database schema.

4. The computer-implemented method of claim 3, wherein receiving the information further comprises receiving internal information from one or more internal information sources.

5. The computer-implemented method of claim 4, wherein applying the one or more conditions based at least in part on the ontology model further comprises performing a statistical analysis on the external information and the internal information to determine one or more statistical measurements relating at least a portion of the external information to at least a portion of the internal information, and wherein the one or more conditions are determined based at least in part on the one or more statistical measurements.

6. The computer-implemented method of claim 5, wherein the one or more statistical measurements include a particular statistical measurement that relates one or more transactions of the organization with one or more activities of a vendor of the organization.

7. The computer-implemented method of claim 1, wherein the one or more information sources includes a website configured to offer, for consumption, an item purporting to be from the organization.

8. A non-transitory computer-readable storage medium having stored thereon instructions for causing at least one computer system to detect policy violations for an organization, the instructions comprising:
   instructions that cause the at least one computer system to receive information from one or more information sources;
   instructions that cause the at least one computer system to specify one or more parameters for identifying the information;
   instructions that cause the at least one computer system to update an ontology model based at least in part on the information, the ontology model defining an association between the information and a data element in a database schema;
   instructions that cause the at least one computer system to apply one or more conditions, based at least in part on the ontology model, to detect at least one policy violation;
   instructions that cause the at least one computer system to identify, based at least in part on the ontology model, one or more information sources associated with the policy violation; and
   instructions that cause the at least one computer system to provide an identification of the one or more information sources associated with the policy violation.

9. The computer-readable storage medium of claim 8, further comprising instructions that cause the at least one computer system to:
   measure a rate of receipt of the received information, the rate of receipt indicative of a particular amount of the information being received from the one or more information sources;
   adjust at least one of the one or more parameters to modify the rate of the received information when the rate deviates from a range of acceptable values; and
   receive the information according to the modified rate.

10. The computer-readable storage medium of claim 8, wherein the instructions that cause the at least one computer system to receive the information further comprise instructions that cause the at least one computer system to receive external information and internal information from the one or more information sources.

11. The computer-readable storage medium of claim 10, further comprising instructions that cause the at least one computer system to map the external information and the internal information to the data element in the database schema.

12. The computer-readable storage medium of claim 10, wherein the instructions further comprise instructions to perform a statistical analysis based at least in part on ontology model to determine one or more statistical measurements relating at least a portion of the external information and to at least a portion of the internal information, and wherein the one or more conditions are determined based at least in part on the one or more statistical measurements.

13. The computer-readable storage medium of claim 12, wherein the one or more statistical measurements include a particular statistical measurement that relates one or more transactions of the organization with one or more activities of a vendor of the organization.

14. The computer-readable storage medium of claim 8, wherein the one or more information sources include a website configured to offer, for consumption, an item purporting to be from the organization.

15. A system for detecting policy violations for an organization, comprising:
one or more processors; and
a memory coupled with the one or more processors, the memory configured to store instructions that when executed by the one or more processors cause the one or more processors to:
receive information from one or more information sources;
specify one or more parameters for identifying the information;
update an ontology model based at least in part on the information, the ontology model defining an association between the information and one or more data elements in a database schema;
apply one or more conditions, based at least in part on the ontology model, to detect at least one policy violation;
identify, based at least in part on the ontology model, one or more information sources associated with the policy violation; and
provide an identification of the one or more information sources associated with the policy violation.

16. The system of claim 15, wherein the ontology model is based at least in part on a plurality of user-defined semantic objects and a plurality of user-defined relationships among the semantic objects.

17. The system of claim 15, wherein the one or more information sources includes a website configured to offer, for consumption, an item purporting to be from the organization.

18. The system of claim 15, wherein the instructions that when executed by the one or more processors further cause the one or more processors to:
apply the one or more conditions based at least in part on the ontology model by performing a statistical analysis on a portion of the information to determine one or more statistical measurements, wherein the one or more conditions are based at least in part on the one or more statistical measurements.

19. The system of claim 18, wherein the one or more statistical measurements include a particular statistical measurement that relates one or more transactions of the organization with one or more activities of a vendor of the organization.

20. The system of claim 15, wherein the instructions that when executed by the one or more processors further cause the one or more processors to:
measure a rate of receipt of the received information, the rate of receipt indicative of a particular amount of the information being received from the one or more information sources;
adjust at least one of the one or more parameters to modify the rate of the received information when the rate deviates from a range of acceptable values; and
cause one or more communications devices to receive the information according to the modified rate.

* * * * *

UNITED STATES PATENT AND TRADEMARK OFFICE
CERTIFICATE OF CORRECTION

PATENT NO. : 10,169,763 B2
APPLICATION NO. : 14/599194
DATED : January 1, 2019
INVENTOR(S) : B'Far et al.

It is certified that error appears in the above-identified patent and that said Letters Patent is hereby corrected as shown below:

On the Title Page

On page 3, Column 1, under Other Publications, Line 52, delete "Proceociings" and insert -- Proceedings --, therefor.

On page 3, Column 1, under Other Publications, Line 56, after "IEEE" insert -- Transactions --.

In the Specification

In Column 1, Line 7, delete "continuation," and insert -- continuation of, --, therefor.

In Column 1, Line 8, after "of" delete "of".

In the Claims

In Column 17, Line 29, in Claim 2, delete "A" and insert -- The --, therefor.

Signed and Sealed this
Seventh Day of January, 2020

Andrei Iancu
*Director of the United States Patent and Trademark Office*